Patented Mar. 27, 1945

2,372,615

UNITED STATES PATENT OFFICE 2,372,615

ETHERS OF STYRENE GLYCOL

Charles A. Thomas, Mad River Road, and Carroll A. Hochwalt, Rahn Road, Ohio, assignors to Monsanto Chemical Company, a corporation of Delaware No Drawing. Application June 10, 1942, Serial No. 446,543

6 Claims. (Cl. 260—611)

The present invention relates to the reaction of styrene oxide with monohydric alcohols and to certain new products obtained thereby.

According to the invention, styrene oxide is reacted with aliphatic, cyclo-aliphatic, or arylaliphatic alcohols to give ethers of styrene glycol having the following general formula:

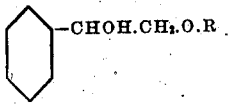

-CHOH.CH$_2$.O.R wherein R is a hydrocarbon radical of the aliphatic, cycloaliphatic or arylaliphatic series of more than three carbon atoms. Of particular value are those compounds where R represents four or more carbon atoms.

While it is known to react alkylene oxides with alcohols in order to obtain glycol ethers, the reaction of aralkylene oxides, particularly of styrene oxide, with alcohols for the production of ethers of aralkylene glycols, for example, ethers of styrene glycol, has not heretofore been effected. As an unsymmetrical oxide, weighted by the phenyl radical, the successful employment of styrene oxide as an initial material in the preparation of styrene glycol ethers apparently necessitates the use of conditions which differ materially from those used in the preparation of such compounds as the ethylene glycol ethers from ethylene oxide. Illustrative of this, Stoermer, Ber. 39, 2302 (1906) showed that etherification of diphenyl propylene oxide could not be carried out with alcoholic KOH at a high temperature.

We have now found that styrene glycol ethers are readily obtainable from styrene oxide if the reaction with alcohols be effected in the presence of very small amounts of acidic or basic condensing agents. As acidic condensing agents useful for the purpose of the invention may be mentioned sulfuric, phosphoric or hydrochloric acid or acid reacting salts such as sodium bisulfate and boron trifluoride. As basic condensing agents may be mentioned sodium hydroxide, potassium hydroxide, calcium hydroxide, triethanolamine and pyridine. While the reaction of an alkylene oxide like ethylene oxide with alcohols for the production of ethers of ethylene glycol is advantageously effected in the presence of, say, at least 1% of concentrated sulfuric acid, styrene glycol ethers are obtainable from styrene oxide and alcohols in presence of only traces of catalytic agents. Thus, when employing concentrated sulfuric acid as catalyst, styrene glycol ethers may be prepared in presence of from only 0.001% to 0.1% of the condensing agent with respect to the quantity of styrene oxide, the use of greater amounts of catalyst resulting in the formation of undesirable, heterogeneous condensation products.

For the preparation of the mono-beta-alkyl ethers of styrene glycol we proceed as follows: We gradually add styrene oxide to the alcohol which has been brought to boiling temperature and which contains from 0.001% to 0.10% of sulfuric or phosphoric acid by weight, based upon the quantity of styrene oxide employed. When phosphoric acid is employed somewhat more acid may be employed. The resulting mixture is refluxed with stirring for from 30 minutes to 12 hours, depending upon the reactivity of the individual alcohol employed and the size of the run, allowed to cool to room temperature, treated with an alkaline agent in order to neutralize the acid catalyst, and then we separate the styrene glycol mono-beta-alkyl ether by fractionation under partial vacuum.

As the alcohol component in the production of mono- or di-alkyl or aralkyl ethers of styrene glycol according to the invention we may employ any aliphatic, cycloaliphatic or arylaliphatic alcohol, for example, methanol, ethanol, propanol, isopropanol, butanol, isobutanol, tert.-isobutanol, the pentanols, the hexanols, the octanols, lauryl alcohol, stearyl alcohol, cyclohexanol, benzyl alcohol, alpha-phenylethyl alcohol, beta-phenylethyl alcohol, gamma-phenylpropyl alcohol, etc.

The styrene glycol ethers of the present invention constitute a series of highly valuable compounds which find application in the industry as solvents, plasticizers for synthetic resins, cellulose acetate, etc., and as intermediates in the preparation of plasticizers, for example, ether-esters of styrene glycol and in the preparation of such textile treating agents and textile adjuvants as wetting agents, detergents, water-repellents, etc. They range from viscous liquids to semi-solid or solid, wax-like products depending upon the number of carbon atoms in the alkoxy groups and are generally characterized by insolubility in water and solubility in the usual organic solvents.

The invention is illustrated, but not limited, by the following examples:

*Example 1*

Over a period of 20 minutes we add 48 g. of styrene oxide to a boiling mixture of 44 g. of anhydrous *n*-butanol and 4 drops of 100% sulfuric acid. We then reflux the reaction mixture for one hour, allow it to cool to room temperature, wash it with aqueous sodium bicarbonate, and distil the whole under partial vacuum. Proceeding in this manner we obtain 36 g. of crude beta-phenyl-beta-hydroxyethyl butyl ether, B. P. 140° C. to 170° C./18 mm. and 13 g. of a mixture of diphenyldioxanes, B. P. 170° C./18 mm. to 215° C./3 mm. Upon redistillation of the lower boiling fraction we obtain substantially pure beta-phenyl-beta-hydroxyethyl butyl ether, B. P. 149° C. to 151° C./18 mm., $n_D^{24}$ 1.5030

$D_{25}^{25}$ 1.020

$M_R$ calcd. 57.2, $M_R$ found 56.3, which analyzed as follows:

|  | Percent C | Percent H |
|---|---|---|
| Found | 72.43 | 8.67 |
| Calcd. for $C_{12}H_{18}O_2$ | 74.3 | 9.28 |

The lower boiling fraction still contains traces of diphenyl-dioxanes.

By a similar procedure we may employ isobutanol and obtain the corresponding isobutyl ether.

*Example 2*

We heat to boiling a mixture consisting of 32 g. of absolute ethyl alcohol and 2 cc. of 85% phosphoric acid and then during a period of 15 minutes gradually add 60 g. of styrene oxide. The reaction mixture is refluxed for 3 hours, allowed to cool to room temperature, washed with aqueous sodium bicarbonate, and vacuum distilled. Operating in this manner we obtained 39 g. of a fraction B. P. 115° C. to 150° C./18 mm., $n_D^{25}$ 1.5172, which comprises crude styrene glycol beta-ethyl ether and 17 g. of a fraction, B. P. 150° C. to 222° C./18 mm., which is 2,6-diphenyldioxane.

*Example 3*

We warm gently over a low flame a mixture consisting of 39 g. (0.3 mole) of 2-ethylhexanol and 1 cc. of 85% phosphoric acid and then gradually add, during a period of thirty minutes, 24 g. (0.2 mole) of styrene oxide. When addition of styrene oxide has been completed, we boil the reaction mixture for 3 hours, being careful to avoid vigorous bumping in the reaction vessel. We then allow the reaction mixture to cool to room temperature, extract it with benzene and wash the extract with aqueous sodium bicarbonate. Upon distillation of the washed extract under partial vacuum, we obtain 30 g. of a fraction, B. P. 154° C. to 244° C./16 mm. Redistillation of this fraction yields substantially pure beta-phenyl-beta-hydroxyethyl beta'-ethylhexyl ether, B. P. 172° C. to 182° C./16 mm., $n_D^{25}$ 1.5055, $D_{25}^{25}$ 0.993

$M_R$ calcd. 75.7, $M_R$ found 75.0, and analyzing as follows:

|  | Percent C | Percent H |
|---|---|---|
| Found | 77.95 | 9.34 |
| Calcd. for $C_{16}H_{26}O_2$ | 76.80 | 10.40 |

The separation of diphenyldioxanes from this high-boiling ether cannot readily be effected by distillation; hence the purity of the product is lower than that of Examples 1 and 2.

*Example 4*

We proceed as in Example 3, except that instead of using the 2-ethylhexanol of Example 3, we now employ 56 g. (0.3 mole) of lauryl alcohol. Upon distillation of the washed benzene extract we obtain a fraction, B. P. 115° C. to 205° C./3 mm., which upon redistillation yields substantially pure beta-phenyl-beta-hydroxyethyl lauryl ether, B. P. 176° C. to 180° C./3 mm., $n_D^{25}$ 1.5080.

$D_{25}^{25}$ 0.985

$M_R$ calcd. 94.2, $M_R$ found 92.0. The product is contaminated with relatively small amounts of diphenyl-dioxanes.

While the above examples illustrates the use only of sulfuric acid or phosphoric acid as condensing agents in the reaction of styrene oxide with alcohols, we likewise obtain good results when operating in the presence of other acidic catalysts, e. g., hydrochloric acid, toluenesulfonic acid, etc. Moreover, instead of acidic condensing agents, we may employ basic condensing agents, such as for example alkali metal hydroxides, organic amines, etc. When using either acidic or basic catalysts, however, caution must be employed in arriving at the optimum catalyst concentration, very small amount of the condensing agents being conducive to the production of the best yields of the mono-ethers and to the suppression of undesirable by-products. We have found that the formation of diphenyl-dioxanes by self-condensation of the styrene oxide generally accompanies the reaction of styrene oxide with alcohols, and that the dimerization of the styrene oxide can generally be minimized by judicious limitation of catalyst concentration as well as by the use of an excess of the alcohol as diluent.

The reaction of styrene oxide with alcohols for the production of beta-ethers of styrene glycol is readily effected in absence of an extraneous solvent and under atmospheric pressure; however, the use of extraneous solvents and of either added or reduced pressure is not excluded from the scope of the invention. Modifications of the process as described in the above examples with respect to the employment of solvents and variation in pressure, time and temperature will be readily apparent to those skilled in the art.

What we claim is:

1. The method of producing mono-beta-ethers of styrene glycol comprising reacting styrene oxide with an alcohol.

2. The method of producing mono-beta-ethers of styrene glycol, which comprises reacting styrene oxide with an alcohol in the presence of a catalyst.

3. The method of producing mono-beta-ethers of styrene glycol, which comprises reacting styrene oxide with an alcohol in the presence of an acidic condensation catalyst.

4. The method of producing mono-beta-ethers of styrene glycol, which comprises reacting styrene oxide with an alcohol in the presence of a basic condensation catalyst.

5. The method of producing the beta-mono-lauryl ether of styrene glycol, which comprises reacting lauryl alcohol with styrene oxide in the presence of a condensation catalyst.

6. The beta-mono-lauryl ether of styrene glycol.

CHARLES A. THOMAS.
CARROLL A. HOCHWALT.